United States Patent
Zhu et al.

(10) Patent No.: US 12,118,649 B2
(45) Date of Patent: Oct. 15, 2024

(54) DEEP LEARNING BASED THREE-DIMENSIONAL RECONSTRUCTION METHOD FOR LOW-DOSE PET IMAGING

(71) Applicants: ZHEJIANG LAB, Hangzhou (CN); MINFOUND MEDICAL SYSTEMS CO., LTD, Hangzhou (CN)

(72) Inventors: Wentao Zhu, Hangzhou (CN); Bao Yang, Hangzhou (CN); Long Zhou, Hangzhou (CN); Hongwei Ye, Hangzhou (CN); Ling Chen, Hangzhou (CN); Fan Rao, Hangzhou (CN); Yaofa Wang, Hangzhou (CN)

(73) Assignees: ZHEJIANG LAB, Hangzhou (CN); MINFOUND MEDICAL SYSTEMS CO., LTD, Hangzhou (CN)

( * ) Notice: Subject to any disclaimer, the term of this patent is extended or adjusted under 35 U.S.C. 154(b) by 188 days.

(21) Appl. No.: 17/616,161

(22) PCT Filed: Jan. 23, 2021

(86) PCT No.: PCT/CN2021/073462
§ 371 (c)(1),
(2) Date: Dec. 2, 2021

(87) PCT Pub. No.: WO2021/159948
PCT Pub. Date: Aug. 19, 2021

(65) Prior Publication Data
US 2022/0383565 A1    Dec. 1, 2022

(30) Foreign Application Priority Data
Feb. 11, 2020 (CN) .......................... 202010087761.0

(51) Int. Cl.
*G06T 11/00* (2006.01)

(52) U.S. Cl.
CPC .......... *G06T 11/006* (2013.01); *G06T 11/005* (2013.01); *G06T 2211/421* (2013.01)

(58) Field of Classification Search
CPC . G06T 11/006; G06T 11/005; G06T 2211/421
See application file for complete search history.

(56) References Cited

U.S. PATENT DOCUMENTS

| | | |
|---|---|---|
| 2018/0197317 A1 | 7/2018 | Cheng et al. |
| 2019/0365341 A1 | 12/2019 | Chan et al. |

(Continued)

FOREIGN PATENT DOCUMENTS

| | | |
|---|---|---|
| CN | 102737392 A | 10/2012 |
| CN | 103810735 A | 5/2014 |

(Continued)

OTHER PUBLICATIONS

International Search Report (PCT/CN2021/073462); Date of Mailing: Apr. 27, 2021.

(Continued)

*Primary Examiner* — Ian L Lemieux
*Assistant Examiner* — Sebastian-Sy Vuchi Ngo
(74) *Attorney, Agent, or Firm* — W&G Law Group

(57) ABSTRACT

Disclosed is a three-dimensional low-dose PET reconstruction method based on deep learning. The method comprises the following steps: back projecting low-dose PET raw data to the image domain to maintain enough information from the raw data; selecting an appropriate three-dimensional deep neural network structure to fit the mapping between the back projection of the low-dose PET and a standard-dose PET image; after learning from the training samples the network parameters are fixed, realizing three-dimensional PET image reconstruction starting from low-dose PET raw data, thereby obtaining a low-dose PET reconstructed image which has a lower noise and a higher resolution compared (Continued)

with the traditional reconstruction algorithm and image domain noise reduction processing.

1 Claim, 1 Drawing Sheet

(56) References Cited

U.S. PATENT DOCUMENTS

2021/0007695 A1* 1/2021 Lu .................. G06T 11/003
2021/0124067 A1* 4/2021 Aykac .............. G06T 5/50

FOREIGN PATENT DOCUMENTS

| CN | 104183012 A | 12/2014 |
| CN | 107133997 A | 9/2017 |
| CN | 109102550 A | 12/2018 |
| CN | 109166161 A | 1/2019 |
| CN | 109559360 A | 4/2019 |
| CN | 109712213 A | 5/2019 |
| CN | 110009613 A | 7/2019 |
| CN | 110415311 A | 11/2019 |
| CN | 110462689 A | 11/2019 |
| CN | 110559008 A | 12/2019 |
| CN | 110599420 A | 12/2019 |
| CN | 110717951 A | 1/2020 |
| CN | 111325686 A | 6/2020 |
| EP | 2711738 A1 | 3/2014 |
| WO | WO-2016178116 A1 * | 11/2016 ........... G01T 1/2985 |

OTHER PUBLICATIONS

First Office Action(202010087761.0); Date of Mailing: Feb. 2, 2021.
Notice Of Allowance(202010087761.0); Date of Mailing: Mar. 4, 2021.
PET image reconstruction and motion correction using direct backprojection on point grids and clouds; Date of Mailing: Feb. 21, 2012.
Research on the Key Issues of Machine Learning based Low-dose CT Imaging; Date of Mailing: Jun. 15, 2019.
Framing U-Net via Deep Convolutional Framelets: Application to Sparse-View CT; Date of Mailing: Jun. 30, 2018.

* cited by examiner

DEEP LEARNING BASED THREE-DIMENSIONAL RECONSTRUCTION METHOD FOR LOW-DOSE PET IMAGING

CROSS-REFERENCE TO RELATED APPLICATIONS

The present application is a National Phase of International Application No. PCT/CN2021/073462, filed on Jan. 23, 2021, which claims priority to Chinese Application No. 202010087761.0, filed on Feb. 11, 2020, the contents of both of which are incorporated herein by reference in their entireties.

TECHNICAL FIELD

The present application relates to the field of medical imaging, in particular to a deep learning based three-dimensional reconstruction method for low-dose PET.

BACKGROUND

Positron Emission Tomography (PET) is a leading example of medical imaging which can provide quantitative biochemical and physiological information in vivo, and has important applications in oncology, cardiology, neurology and mental diseases. PET/CT has also become the internationally recognized gold standard for tumor detection. The procedure of PET imaging starts from injecting the radioactive tracer into a patient before scanning. When the tracer participates in physiological metabolism, it decays to emit positrons. When a positron collides with an electron it gives rise to two 511 keV photons which, in general, are emitted simultaneously and travel in almost exactly opposite directions along a straight line path. If the two photons are simultaneously detected by two small detectors in the PET scanner, the line connecting the two detectors is referred to as the Lines of Response (LOR). The LORs are collected and stored as a sinogram serving as the three-dimensional PET raw data. After attenuation, random and scatter correction, the sinogram is reconstructed by a three-dimensional iterative reconstruction method to obtain three-dimensional PET images representing metabolic intensity of various tissues in a human body.

By reducing the dose of the radioactive tracer injected into the patient, the radiation exposure to the patient and medical staff can be reduced, the scanning time can be shortened, and the imaging cost can be reduced. Therefore, low-dose PET reconstruction has become one of the hottest topics in the field of nuclear medicine, especially in the application fields of epilepsy in infants and depression in adolescents. However, the decrease of the tracer injection leads to the increase of the interference of random coincidences and scatter coincidences with true coincidences received by a PET scanner, which reduces the signal-to-noise ratio of the raw PET data, and further leads to the PET images obtained by traditional reconstruction methods being polluted by a large amount of noise, which seriously affects the reading and diagnosis of clinicians.

In recent years, with the rapid development of computer technology, deep learning has made great breakthroughs in applications of natural image processing, speech recognition and so on, and has been widely used in medical imaging. In order to suppress the noise in the reconstructed low-dose PET image obtained by traditional reconstruction algorithms and retain the useful lesion information, deep learning methods have been introduced to improve the low-dose PET imaging. At present, such methods mainly focus on image post-processing, that is, establishing a mapping from and the noisy low-dose PET images to the standard-dose PET images in the image domain. Because the traditional low-dose PET reconstruction process can not completely retain the useful high-frequency information in the raw data, the generalization ability of the neural network used for fitting the mapping is insufficient, which leads to the result that image artifacts and quantitative errors become the performance bottleneck of this kind of technical route.

SUMMARY

The purpose of the present application is to break through the performance bottleneck of the existing low-dose PET reconstruction method based on image post-processing technology, and provide a three-dimensional PET image reconstruction method based on deep learning and starting from PET raw data. In this method, the low-dose PET raw data is back projected into the image domain to obtain a highly blurred laminogram that maintains enough information from the raw data, and an estimation of the PET image is recovered from the laminogram by using a three-dimensional U-Net fitted deconvolution operation in image domain, and the reconstructed PET image is further refined by a series of three-dimensional residual blocks. Network parameters are learned and fixed by using the prior knowledge of the training samples, and finally applied to reconstruct the unseen three-dimensional low-dose PET image, so as to obtain reconstructed low-dose PET images with a lower noise and a higher resolution compared with the traditional reconstruction result and PET images obtained by denoising the traditional reconstruction result.

The purpose of the present application is realized by the following technical solution: a three-dimensional low-dose PET reconstruction method based on deep learning, including the following steps:

(1) performing a back projection operation on the low-dose PET raw data, which specifically comprises the following sub-steps:

(1.1) performing attenuation correction processing on the low-dose PET raw data, and obtaining a back projection $l_{pp\_ac}$ of the attenuation corrected low-dose PET data using the transposed system matrix of the PET scanner;

(1.2) obtaining a back projection $l_{rs}$ of random and scatter data by subjecting the random and scatter data of the low-dose PET raw data to the transposed system matrix of the PET scanner;

(1.3) simulating an all-1 PET image, subjecting the image to the system matrix of the PET scanner to obtain a three-dimensional projection of it, and then back projecting the result of the three-dimensional projection into the image domain to obtain the back projection $l_1$ of the all-1 PET image;

(1.4) subtracting $l_{rs}$, the back projection of the random and scatter data obtained in step (1.2), from $l_{pp\_ac}$, the back projection of the low-dose PET data after attenuation correction obtained in step (1.1), to implement random and scatter corrections, and then dividing by $l_1$, the back projection of the all-1 PET image, to obtain a corrected and regularized three-dimensional low-dose PET back projection $l_{bp}$:

$$l_{bp} = \frac{l_{pp\_ac} - l_{rs}}{l_1} \tag{1}$$

(2) taking $l_{bp}$, the corrected and regularized three-dimensional back projection of the low-dose PET obtained in step (1.4), as an input of a deep neural network, taking a reconstructed standard-dose PET image as a label of the network, updating parameters of the deep neural network through Adam optimization algorithm, minimizing a target loss function, and completing training of the deep neural network, wherein the target loss function for training the deep neural network is as follows:

$$L = \frac{1}{N_x N_y N_z} \sum_{i=1}^{N_x} \sum_{j=1}^{N_y} \sum_{k=1}^{N_z} |C(l_{bp}(i,j,k)) - f^{full}(i,j,k)| \quad (2)$$

where $N_x$, $N_y$, $N_z$ represent the total numbers of pixels of the low-dose PET back projection or the standard-dose PET image in horizontal, vertical and axial directions, respectively, C(·) represents mapping from the low-dose PET back projection $l_{bp}$ to the standard-dose PET reconstructed image $f^{full}$ fitted by a three-dimensional deep neural network, and (i, j, k) represents pixels in the image; and (3) performing the back projection method in step 1 on newly acquired low-dose PET raw data, and feeding the data into the deep neural network trained in step 2 to obtain a reconstructed low-dose PET image.

Compared with the prior art, the method disclosed by the present application has the following beneficial effects: starting from low-dose PET raw data, artifacts and quantitative errors caused by insufficient generalization ability of the neural network mapping in the image domain are inhibited. In addition, the method of back projecting the low-dose PET raw data to the image domain is proposed in the present application, which reduces the computational complexity of directly fitting the mapping from the low dose raw data to the standard dose PET image using the neural network, improves the network training efficiency, and reduces the time required to test the network, that is, to generate reconstructed low-dose PET images, so that it is far less time consuming than the traditional iterative reconstruction algorithms, and can obtain PET images with a higher signal-to-noise ratio than the traditional reconstruction algorithms applied to the same dose level.

DESCRIPTION OF EMBODIMENTS

The present application will be further explained with reference to the drawings and examples.

Figure 1:
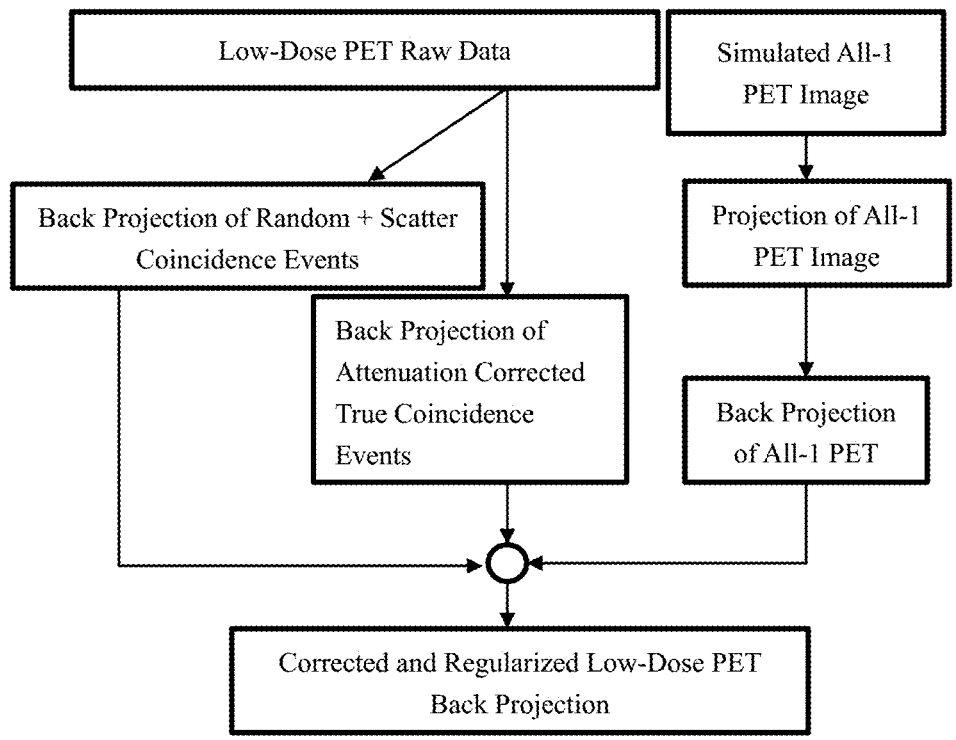
FIG. 1 is a flow chart of the back projection method of low dose PET raw data.

The low-dose raw data acquired by the PET scanner is a three-dimensional sinogram composed of projecting a PET image through the three-dimensional X-ray transformation. The three-dimensional sinogram contains not only the axial plane projections but also the oblique plane projections passing through the axial plane, and has the characteristics of large amount of data and high redundancy of information. It is difficult to fit the mapping from sinogram to PET image directly by a neural network due to the limitation of computing and storage capacities. The back projection method of the three-dimensional sinogram that can maintain information of the sinogram provided by the present application follows a flow chart as shown in FIG. 1:

(1.1) attenuation correction processing is performed on the low-dose raw PET data, and a back projection of the attenuation corrected low-dose PET data, $l_{pp\_ac}$, is obtained using the transposed system matrix of a PET scanner;

(1.2) a back projection of random and scatter data, $l_{rs}$, is obtained by subjecting the random and scatter data of the low-dose PET data to the transposed system matrix of the PET scanner;

(1.3) to deal with the spatial variance of the three-dimensional projection and back projection process caused by the limited axial extent of the PET scanner, the present application provides a regularization method for PET back projection; laminogram of a simulated all-1 PET image is generated by subjecting the simulated all-1 PET image to the system matrix of the PET scanner, and then a result of projection is back projected into the image domain to obtain a back projection of the all-1 PET image, $l_1$;

(1.4) the back projection of the random and scatter data obtained in step (1.2), $l_{rs\_ac}$, is subtracted from the back projection of the low-dose PET data after attenuation correction obtained in step (1.1), $l_{pp\_ac}$, to implement random and scatter correction, and then the result is divided by the back projection of the all-1 PET image, $l_1$, to obtain the corrected and regularized low-dose PET three-dimensional back projection $l_{bp}$:

$$l_{bp} = \frac{l_{pp\_ac} - l_{rs}}{l_1} \quad (1)$$

The relationship between the corrected and regularized low-dose PET three-dimensional back projection $l_{bp}$ and the PET reconstructed image is expressed as follows:

$$f(x,y,z) = l_{bp}(x,y,z) * F^{-1}\left\{\frac{1}{H(\upsilon,\psi)}\right\} \quad (3)$$

where f(x,y,z) and $l_{bp}$(x,y,z) represent the activity values of the three-dimensional PET image and the corrected and regularized back projection at a certain point (x,y,z), respectively, H($\upsilon,\Psi$) is the three-dimensional Fourier transform of rotationally symmetric PSF (point spread function) expressed in spherical coordinates, and is defined as:

$$H(\upsilon,\psi) = \begin{cases} \dfrac{2\pi}{\upsilon} & |\psi| \leq \Theta \\ \dfrac{4\sin^{-1}\left(\dfrac{\sin\Theta}{|\sin\psi|}\right)}{\upsilon} & |\psi| > \Theta \end{cases} \quad (4)$$

$$F^{-1}\left\{\frac{1}{H(\upsilon,\psi)}\right\}$$

represents a ramp-type three-dimensional image domain filter, convolving the PET back projection with the filter recovers high-resolution PET images.

The present application provides a three-dimensional deep neural network to fit the nonlinear and spatial variant deblurring filter from the laminogram to the reconstructed PET image. The deep neural network is composed of two parts. The first part is a U-Net composed of 3D convolutional layers, 3D deconvolutional layers, and shortcuts between them. The convolutional layers are used to encode the PET back projection to extract high-level features, and the deconvolutional layers decode the features to obtain the rough estimation of PET images. The shortcuts in the network superimpose the outputs of the convolutional layers and the corresponding deconvolutional layers, which improves the network training effect and effectively prevents degradation without increasing network parameters.

The second part of the deep neural network is composed of multiple residual blocks in series, which are used to further refine the high frequency details in the rough estimation of the PET image. Since the low frequency information contained in the rough estimation of PET image is similar to that of the standard-dose PET image, the residual block can only learn the high frequency residual part between them, so as to improve the efficiency of the network training.

(2) Therefore, the corrected and regularized three-dimensional back projection $l_{bp}$ of the low-dose PET obtained in step (1.4) is taken as an input of a deep neural network, a reconstructed standard-dose PET image is taken as a label of the network, parameters of the deep neural network are updated through Adam optimization algorithm, a target loss function is minimized, and training of the deep neural network is completed. An estimate $\tilde{C}(\cdot)$ of the mapping network is obtained. The standard-dose prior knowledge learned by the training the mapping network $C(\cdot)$ can compensate the high frequency details in the low-dose PET back projection in the testing process. The target loss function of the deep neural network training is as follows:

$$L = \frac{1}{N_x N_y N_z} \sum_{i=1}^{N_x} \sum_{j=1}^{N_y} \sum_{k=1}^{N_z} |C(l_{bp}(i,j,k)) - f^{full}(i,j,k)| \quad (2)$$

where $N_x, N_y, N_z$ represent the total numbers of pixels of the low-dose PET back projection or the standard-dose PET image in horizontal, vertical and axial directions, respectively, $C(\cdot)$ represents mapping from the low-dose PET back projection $l_{bp}$ to the standard-dose PET reconstructed image $f^{full}$ fitted by a three-dimensional deep neural network, and (i, j, k) represents pixels in the image.

(3) Newly acquired low-dose PET raw data are reconstructed by using the trained mapping, $\tilde{C}(\cdot)$: firstly, executing the back projection method in step 1, and feeding the processed back projection into the mapping network $\tilde{C}(\cdot)$ to obtain a corresponding low-dose PET reconstructed image.

Figure 2:
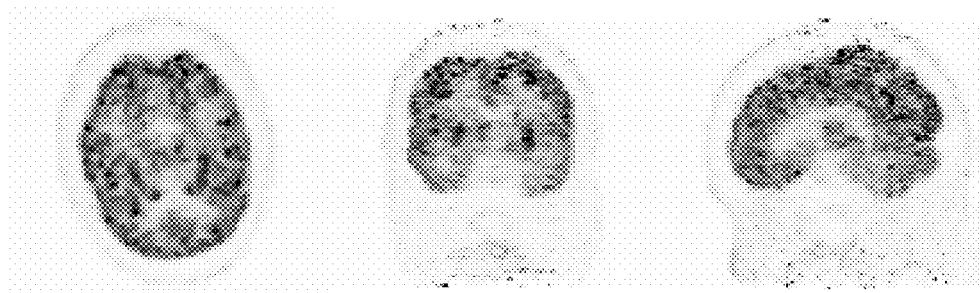
FIG. 2 is a comparison diagram of the reconstructed PET images from using the traditional algorithm and the algorithm of the present application.
Figure 2:
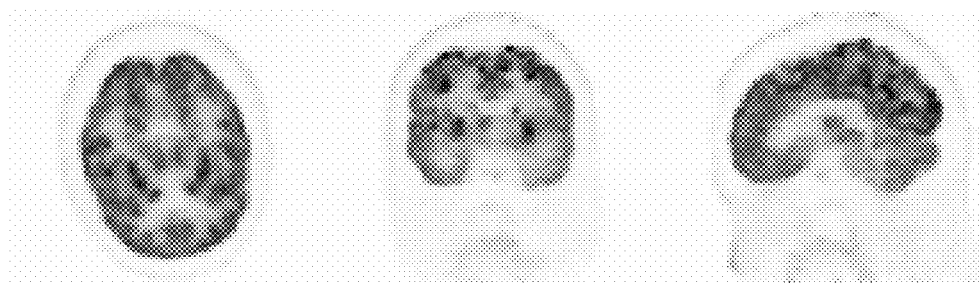

The reconstruction result of low-dose PET data by a traditional reconstruction algorithm is shown in FIG. 2(a). The reconstructed image has large noise and lesions cannot be distinguished from noise; the reconstruction algorithm proposed by the present application can obtain a reconstructed low-dose PET image as shown in FIG. 2(b), and the signal-to-noise ratio of the image 2(b) is obviously higher than that of the image 2(a).

What is claimed is:

1. A three-dimensional low-dose PET reconstruction method based on deep learning, comprising the following steps:
   (1) performing a back projection method for low-dose PET raw data, which specifically comprises the following sub-steps:
   (1.1) performing attenuation correction processing on the low-dose PET raw data, and obtaining $l_{pp\_ac}$, a back projection of the low-dose PET data after attenuation correction through being subjected to the transposed system matrix of a PET scanner;
   (1.2) obtaining $l_{rs}$, a back projection of random and scatter data by subjecting the random and scatter data of the low-dose PET raw data to a transposed system matrix of the PET scanner;
   (1.3) simulating an all-1 PET image, subjecting the all-1 PET image to a system matrix of the PET scanner to obtain a three-dimensional projection, and then back projecting a result of the three-dimensional projection to the image domain to obtain $l_1$, a back projection of the all-1 PET image;
   (1.4) subtracting $l_{rs\_ac}$, the back projection of the random and scatter data obtained in step (1.2) from $l_{pp\_wc}$, the back projection of the low-dose PET data after attenuation correction obtained in step (1.1) to implement random and scatter correction, and then dividing by $l_1$, the back projection of the all-1 PET image to obtain a corrected and regularized three-dimensional low-dose PET back projection $l_{bp}$:

$$l_{bp} = \frac{l_{pp\_ac} - l_{rs}}{l_1} \quad (1)$$

(2) taking $l_{bp}$, the corrected and regularized three-dimensional low-dose PET back projection obtained in step (1.4), as an input of a deep neural network, taking a reconstructed standard-dose PET image as a label of the network, updating parameters of the deep neural network through Adam optimization algorithm, minimizing a target loss function, and completing training of the deep neural network, wherein the target loss function of training the deep neural network is as follows:

$$L = \frac{1}{N_x N_y N_z} \sum_{i=1}^{N_x} \sum_{j=1}^{N_y} \sum_{k=1}^{N_z} |C(l_{bp}(i,j,k)) - f^{full}(i,j,k)| \quad (2)$$

where $N_y$, $N_y$, and $N_z$ represent total numbers of pixels of the low-dose PET back projection or the standard-dose PET image in horizontal, vertical and axial directions, respectively, $C(\cdot)$ represents mapping from the low-dose PET back projection $l_{bp}$ to the standard-dose PET reconstructed image $f^{full}$ fitted by a three-dimensional deep neural network, and (i,j,k) represents pixels in the image; and
   (3) performing the back projection method in step 1 on newly acquired low-dose PET raw data, and inputting the data into the deep neural network trained in step 2 to obtain a corresponding low-dose PET reconstructed image.

* * * * *